United States Patent
Cartwright et al.

(10) Patent No.: US 6,798,165 B2
(45) Date of Patent: Sep. 28, 2004

(54) INTELLIGENT BATTERY VOLTAGE REGULATION FOR HYBRID VEHICLES

(75) Inventors: Kert L. Cartwright, Romeo, MI (US); Brian Munari, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 52 days.

(21) Appl. No.: 10/310,786

(22) Filed: Dec. 6, 2002

(65) Prior Publication Data

US 2004/0108831 A1 Jun. 10, 2004

(51) Int. Cl.[7] .................................................. H02J 7/00
(52) U.S. Cl. ...................................................... 320/104
(58) Field of Search ................................. 320/104, 132, 320/149, DIG. 21; 307/10.1, 64, 66, 67, 65.1–65.3; 318/139; 322/17; 290/17

(56) References Cited

U.S. PATENT DOCUMENTS

| | | | |
|---|---|---|---|
| 5,343,970 A | * | 9/1994 | Severinsky ................ 180/65.2 |
| 5,713,814 A | * | 2/1998 | Hara et al. ...................... 477/5 |
| 5,910,722 A | * | 6/1999 | Lyons et al. ................. 320/104 |
| 6,209,672 B1 | * | 4/2001 | Severinsky ................ 180/65.2 |
| 6,364,434 B1 | | 4/2002 | Sway-Tin et al. ........... 303/152 |

* cited by examiner

*Primary Examiner*—Pia Tibbits
(74) *Attorney, Agent, or Firm*—Edwin W. Bacon, Jr.

(57) ABSTRACT

In a hybrid vehicle having an internal combustion engine that is assisted by an electric motor powered by a traction battery, the electric motor is operated in a generating mode to charge the vehicle battery during periods when neither acceleration assist nor regenerative braking are being performed. Torque of the electric motor is adjusted by a controller to generate a battery charge current which regulates the voltage of the battery to a selected setpoint. The setpoint is determined as a function of vehicle operating parameters, including but not limited to battery temperature.

15 Claims, 3 Drawing Sheets

INTELLIGENT BATTERY VOLTAGE REGULATION FOR HYBRID VEHICLES

BACKGROUND OF THE INVENTION

The present invention is directed to a hybrid vehicle with an internal combustion engine that is assisted by an electric motor, and which uses the electric motor to assist in deceleration of the vehicle by way of regenerative braking. In particular, the invention provides a method and apparatus for controlling the state of charge of the traction battery which is utilized in hybrid vehicles to supply operating power to the electric motor.

In hybrid vehicles of the type referred to, it is extremely important to maintain the state of charge of the traction battery within certain limits in order to optimize both acceleration assist, regenerative deceleration and traction battery life. That is, if the state of charge of the battery is too high, it will be unable to absorb the energy generated by regenerative braking of the vehicle. On the other hand, if the state of charge is too low, insufficient power will be available to provide maximum assistance to the internal combustion engine in an acceleration of the vehicle. Accordingly, it is necessary that the state of charge be regulated in a manner which maintains it within an optimum range.

In vehicles of the type described, the typical method for state of charge maintenance is to control the amount of acceleration assist and regenerative braking during driving of the vehicle. That is, the amount of regenerative braking and acceleration assist which are performed is controlled in order to control the voltage or state of charge of the battery to a setpoint or range, which is determined primarily as a function of battery and system requirements. During those time periods when neither regenerative braking nor acceleration assist is being performed, the electric motor is used in a generator mode to charge the battery.

One difficulty with the typical method for state of charge maintenance is that static loads, such as a DC to DC converter, onboard AC power generation, electric power steering or other traction battery loads discharge the battery pack even when the vehicle is not being driven. Accordingly, it is possible for the battery to be discharged to such a degree that it is unable to provide optimum acceleration assist, as required for operation of the hybrid vehicle.

One object of the present invention is to provide an intelligent battery regulation arrangement which directly compensates for the effect of static loads on the traction battery.

Another object of the invention is to provide a battery regulation algorithm which prevents the state of charge of the battery from falling below optimum limits when the vehicle is not being driven.

Still another object of the invention is to provide a battery state of charge control method which intelligently transitions between voltage regulation control and hybrid traction torque control.

SUMMARY OF THE INVENTION

These and other objects and advantages are achieved by the intelligent battery voltage regulation algorithm according to the invention, in which electric motor is operated in a generating mode to charge the vehicle battery during time periods when neither hybrid assist nor regenerative braking is active. According to the invention, during such time periods closed loop control is performed such that the electric motor torque (that is, the torque applied by the electric motor operating in the generating mode) provides a traction battery charge current which is then used to regulate the traction battery voltage to a specific setpoint. This occurs frequently when the vehicle is at rest (and hence, neither regenerative braking nor acceleration assist is necessary), but may also take place when the vehicle is being driven at a constant speed and load.

The voltage regulation setpoint is selected such that sufficient battery power is available for hybrid assist, and at the same time, sufficient charge capacity is available to absorb energy generated by regenerative braking. The regulation setpoint is also based on battery temperatures, and whether AC power generation is active. Thus, the control algorithm according to the invention directly compensates for static loads by controlling the electric motor to operate in a generator mode (for example, using P, P.I. or P.I.D. feedback control) during those time periods when neither regenerative braking nor hybrid assist is taking place. (Other forms of control, such as feed forward or open loop control are of course also possible.)

It should be noted that the maximum electric motor torque request by the intelligent battery voltage regulation algorithm according to the invention is limited so that the engine idle quality is not adversely effected. The torque request may also decrease with increasing engine RPM.

Other objects, advantages and novel features of the present invention will become apparent from the following detailed description of the invention when considered in conjunction with the accompanying drawings.

DETAILED DESCRIPTION OF THE INVENTION

Figure 1:
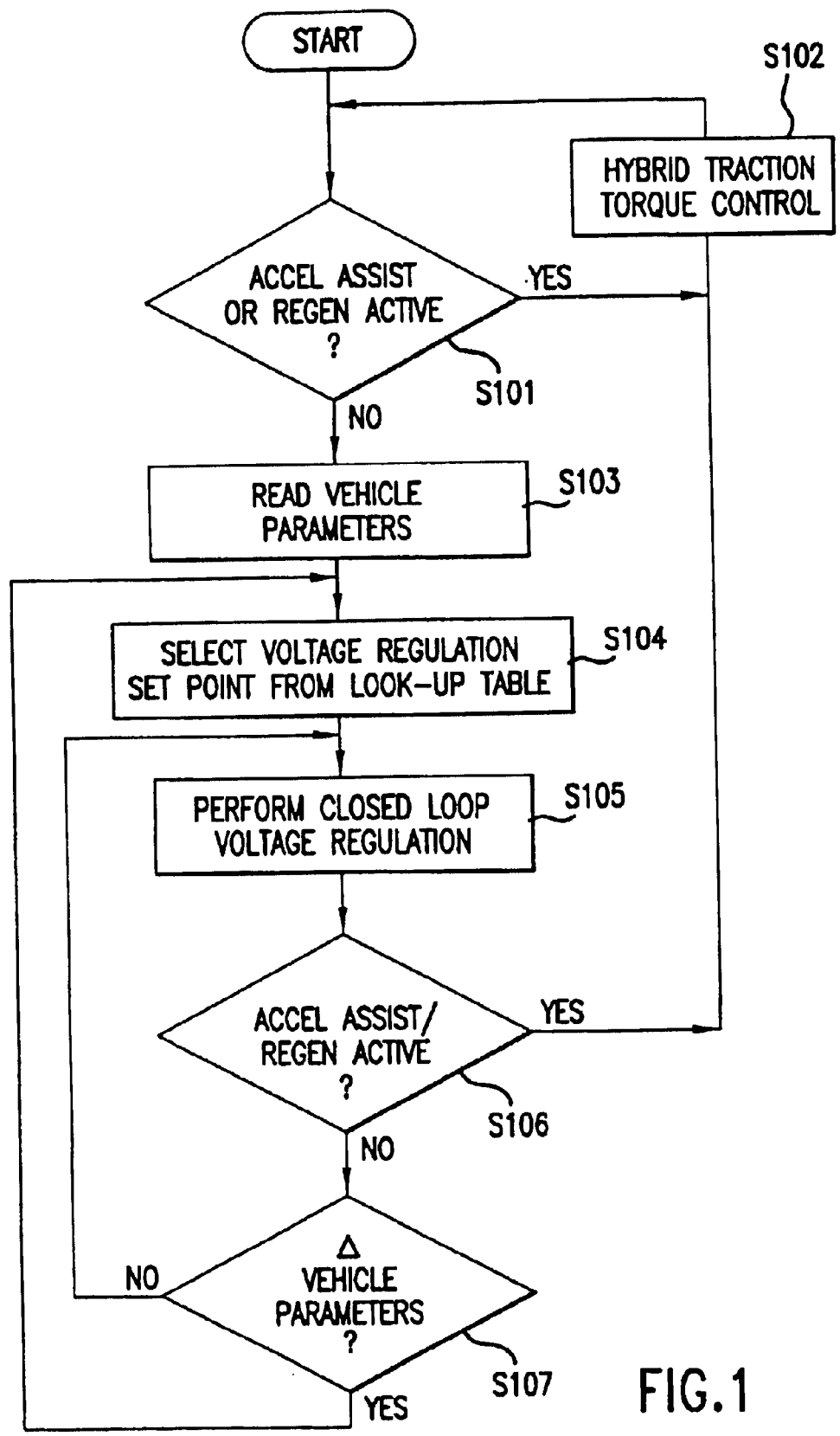
FIG. 1 is a flow diagram which illustrates the steps performed by the intelligent battery voltage regulation algorithm according to the invention.

Referring to FIG. 1, the control process according to the invention commences with a determination in step S111 whether the vehicle is currently performing a hybrid acceleration assist or regenerative braking. If so, hybrid traction torque control is performed in step S102, and the process returns to the start. If, however, neither hybrid acceleration assist or regenerative braking is being performed in step S11, current vehicle operating parameters are read is step S103, including, for example, vehicle engine speed, battery temperature, battery voltage and whether AC power generation is active or not. Thereafter, in step S104, a voltage regulation setpoint is selected in a manner which is well known to those skilled in the art. In particular, an n-dimensional lookup table may be used for this purpose. For example, in general, when the battery temperature is low, the setpoint is increased, while when the battery is hot, the setpoint is decreased. A typical setpoint for a 36 volt battery system operating at room temperature, might be, for example, 42 volts.

After the setpoint has been selected, in step S105, the electric motor is controlled to operate in a generating mode so as to regulate the battery voltage to the selected setpoint, for example, in a manner discussed hereinafter. In step S106, a determination is made once again whether the vehicle is currently operating in an acceleration assist or regenerative braking mode. If so, the process returns to the start, and hybrid traction control is performed as shown in step S102.

If, however, neither acceleration assist nor regenerative braking is taking place, then a determination is made in step S107 whether the vehicle parameters previously read in step S103 have changed. If so, the process returns to step S104 and a new voltage regulation setpoint is determined. If, however, the vehicle continues to operate in a mode in which neither hybrid acceleration assist nor regenerative braking is occurring, and the vehicle parameters have not changed, closed loop control continues in step S105.

Figure 2:
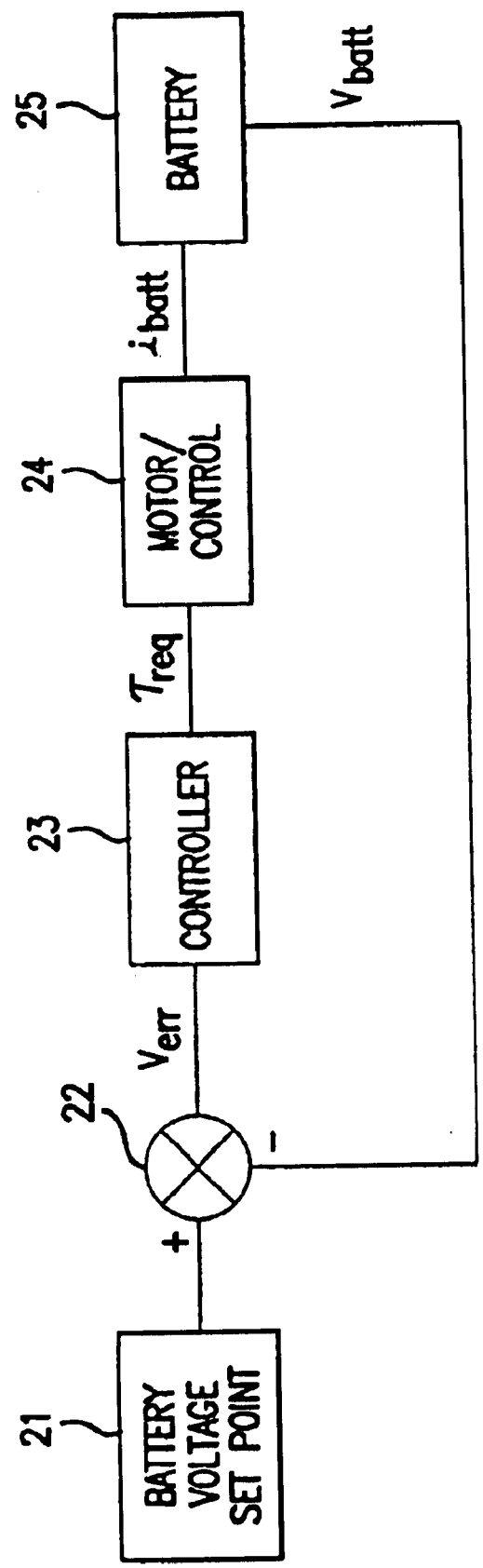
FIG. 2 is a conceptual block diagram which illustrates an example of a closed loop control performed according to the invention.

FIG. 2 is a block diagram which illustrates an example of a control arrangement that is suitable for use in the process and apparatus according to the invention. A battery voltage setpoint, determined as described previously, is entered in block 21 and used to regulate the operation of the motor 24 in order to generate a battery current such that the state of charge of the battery 25 is maintained at the desired setpoint. For this purpose, the battery output voltage $V_{batt}$ is fed back and subtracted from the battery voltage setpoint 22 to generate an error signal $V_{err}$. The latter signal is then input to a controller, which may be any type of known closed loop control unit, including, for example, a P, P.I. or P.I.D. controller. (Other types of control are of course possible.) The controller generates a torque request $\tau_{req}$ which is fed to the motor 24. The latter is operated in a generator mode, and the torque request $\tau_{req}$ is used to control the motor torque in a manner such that the current generated by the motor ($i_{batt}$) is sufficient to maintain the voltage of the battery at the desired setpoint. Typically, the motor 24 is a three-phase induction motor, and its torque is adjusted by regulating the motor phase current, although other types of motors and other control techniques may also be used within the scope of the invention.

It should be noted that the control function performed by the controller 23 may be implemented in the form of a general purpose data processor (FIG. 3) which is provided on board the vehicle, and is generally coupled to numerous vehicle operating systems via a data or communication bus.

Referring once again to FIG. 1, it should be noted that the performance of closed loop control is initiated in each case by active ramping in and out of the voltage regulation algorithm depending on vehicle conditions. That is, in each instance, the transition between operation of the motor for hybrid traction torque control (regenerative braking or acceleration assist) and for intelligent voltage regulation control occurs gradually, so that harsh or annoying changes in engine operating speed are avoided. For this purpose, the controller 23, or general purpose data processor causes the torque request $\tau_{req}$ to ramp up, or increase gradually, rather than abruptly. The maximum electric motor torque request by the intelligent battery voltage control according to the invention is also limited so that the engine idle quality is not adversely affected. Finally, the torque request may also decrease with increasing engine RPM.

Figure 3:
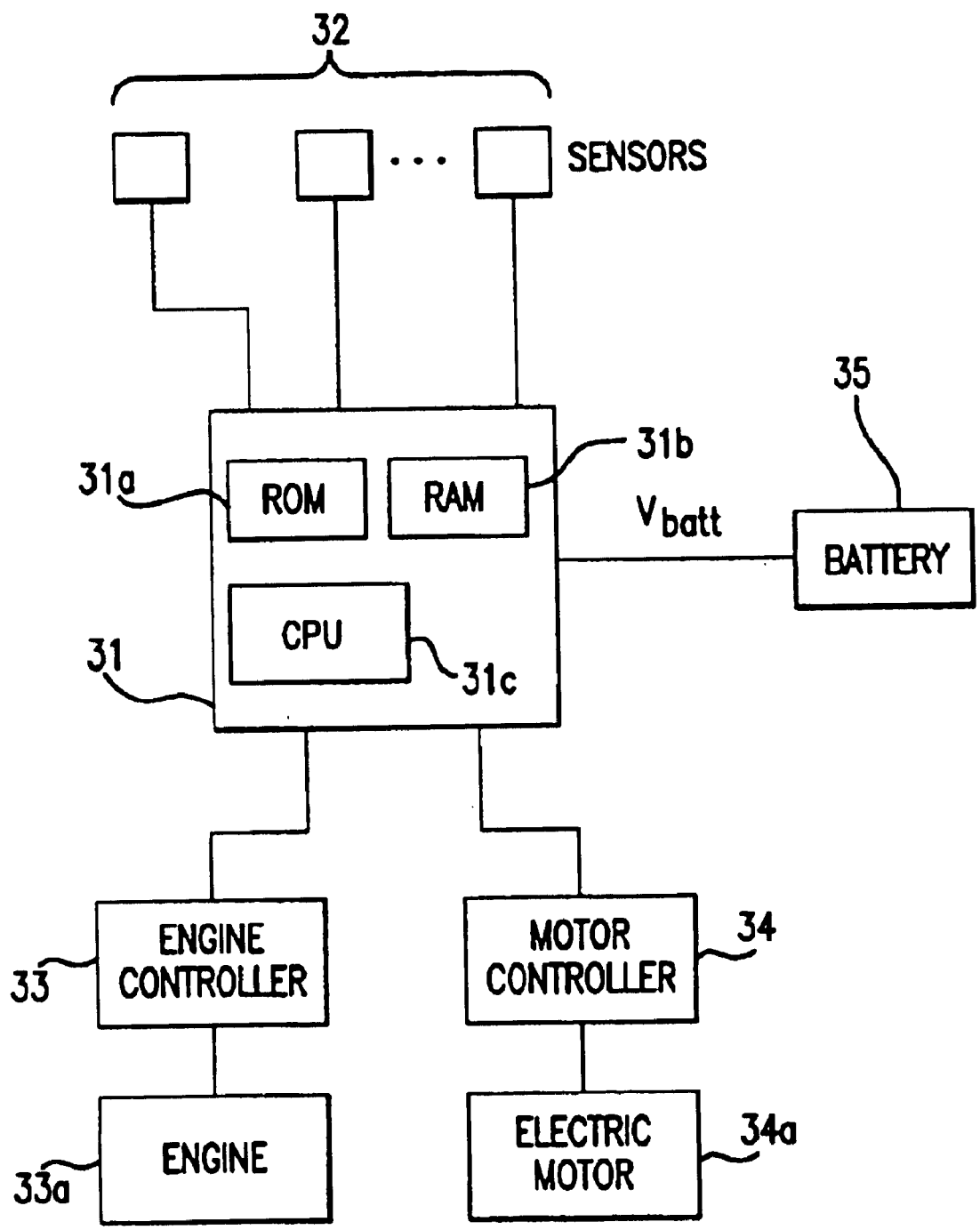
FIG. 3 is a block diagram of a battery voltage regulation apparatus according to the invention.

FIG. 3 is a schematic block diagram which illustrates the apparatus according to the invention for performing intelligent battery voltage regulation. A computer 31, includes a read only memory 31a in which the algorithm according to the invention is stored, together with appropriate lookup tables. A RAM 31b stores information which is currently being processed by the CPU 31c. A variety of sensors 32 are provided for detecting various vehicle operating parameters, and the voltage from battery 35 is also input to the computer 31 as an indication of the state of charge of the battery. The computer 31 is coupled to an engine controller 33 which controls the engine 33a and to a motor controller 34 which controls the electric motor 34a in accordance with the control algorithm shown in FIG. 1. As noted previously, in a preferred embodiment, the computer 31 is coupled to the various sensors and controllers.

It should be noted that the system architecture shown in FIG. 3 is but one example of a suitable hardware set up according to the invention. Other arrangements are of course also possible as will be recognized by those skilled in the art. For example, while the respective controllers are shown as separate modules, they may of course be combined into a single unit.

The intelligent battery voltage regulation method and apparatus according to the present invention provide direct compensation for traction battery static loads which was not heretofore available. In addition, the invention intelligently transitions between voltage regulation control and hybrid traction control for battery management. Thus, longer traction battery life is realized, since the intelligent battery voltage regulation scheme does a better job of maintaining its state of charge. In addition, a more consistent vehicle feel (acceleration/deceleration) is achieved, because the battery state of charge is regulated within a narrower range, optimizing the ability of the system to perform hybrid acceleration assist and regenerative braking. Finally, the present invention maintains the battery state of charge both when the vehicle is stopped and when it is in motion, which is required for hybrid vehicles that have significant static traction battery loads.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating a charge state of a traction battery in a hybrid vehicle having an internal combustion engine that is assisted for acceleration by an electric traction motor energized by the traction battery, said method comprising:

detecting operation of said traction motor in one of an acceleration assist and regenerative braking modes;

only when said electric motor is not operated in one of said acceleration assist and regenerative braking modes, applying torque from said engine to operate said traction motor in a generator mode to supply a charging current to said battery; and controlling operation of said traction motor in said generator mode such that said charging current charges the traction battery to a selected voltage regulation setpoint.

2. The method according to claim 1, wherein said controlling step comprises:

detecting a voltage output from said traction battery;

calculating an error signal by subtracting said voltage output from said voltage regulation setpoint;

utilizing said error signal for generating a torque demand signal; and controlling operation of the traction motor according to the torque demand signal.

3. The method according to claim 2, wherein said step of controlling operation of said traction motor comprises controlling torque of said motor.

4. The method according to claim 3, wherein controlling torque of said traction motor is performed by adjusting a motor phase current of said traction motor.

5. The method according to claim 1, wherein said voltage regulation setpoint is determined based on operating parameters of said vehicle.

6. The method according to claim 5, wherein said operating parameters include at least a temperature of said battery.

7. The method according to claim 1, wherein said step of controlling operation of said traction motor comprises:

a control unit generating a torque command as a function of vehicle operating parameters, including traction battery voltage; and controlling said traction motor to generate a torque corresponding to the torque command.

8. The method according to claim 7, wherein controlling operation of said traction motor is performed by adjusting a motor phase current of said traction motor.

9. An apparatus for regulating a charge state of a traction battery in a hybrid vehicle having an internal combustion engine that is assisted for acceleration and deceleration by an electric traction motor that is energized by the traction battery, said apparatus comprising:

detector means for detecting operation of said traction motor in one of an acceleration assist and regenerative braking modes;

a computer receiving signals from said detector means, and having a memory encoded with a program for only when said traction motor is not operated in one of said acceleration assist and regenerative braking modes, causing said traction motor to operate in a generator mode by absorbing torque from said engine, thereby generating a charging current to said battery; and controlling operation of said traction motor in said generator mode such that said charging current charges the traction battery to a selected voltage regulation setpoint.

10. The apparatus according to claim 9, wherein said controlling operation of the traction motor is performed via a closed loop controller, based on an error signal generated by subtracting a traction battery output voltage from said voltage regulation setpoint.

11. The apparatus according to claim 10, wherein the controller is one of a P, P.I. and a P.I.D. controller.

12. The apparatus according to claim 9, wherein said controlling operation of said traction motor is performed by controlling torque of said traction motor.

13. The apparatus according to claim 12, wherein torque of said traction motor is controlled by adjusting a phase current of said traction motor.

14. The apparatus according to claim 9, further comprising a lookup table for determining said voltage regulation setpoint as a function of vehicle operating parameters, wherein said computer determines said voltage regulation setpoint by accessing said lookup table.

15. The method according to claim 14, wherein said operating parameters include at least a battery temperature of said traction battery.

* * * * *